United States Patent
Mehas et al.

(10) Patent No.: US 9,954,581 B2
(45) Date of Patent: Apr. 24, 2018

(54) APPARATUSES AND RELATED METHODS FOR COMMUNICATION WITH A WIRELESS POWER RECEIVER

(71) Applicant: Integrated Device Technology, Inc., San Jose, CA (US)

(72) Inventors: Gustavo J. Mehas, Mercer Island, WA (US); Vladimir N. Vitchev, San Jose, CA (US)

(73) Assignee: INTEGRATED DEVICE TECHNOLOGY, INC., San Jose, CA (US)

( * ) Notice: Subject to any disclaimer, the term of this patent is extended or adjusted under 35 U.S.C. 154(b) by 505 days.

(21) Appl. No.: 14/168,965

(22) Filed: Jan. 30, 2014

(65) Prior Publication Data
US 2015/0215006 A1   Jul. 30, 2015

(51) Int. Cl.
*H01F 38/00* (2006.01)
*H04B 5/00* (2006.01)
(Continued)

(52) U.S. Cl.
CPC ....... *H04B 5/0037* (2013.01); *G05B 13/0205* (2013.01); *H02J 5/005* (2013.01);
(Continued)

(58) Field of Classification Search
CPC .................................. H02J 5/005; H02J 7/025
(Continued)

(56) References Cited

U.S. PATENT DOCUMENTS

2004/0218406 A1    11/2004  Jang et al.
2009/0021219 A1*   1/2009   Yoda ...................... H02J 7/0011
                                                         320/137
(Continued)

FOREIGN PATENT DOCUMENTS

JP        2010246292 A     10/2010

OTHER PUBLICATIONS

Integrated Device Technology, Inc., "Industry's First Multi-Mode WPC Compliant Wireless Power Receiver IC", Product Datasheet, IDTP9020, pp. 1-27, © 2012 Integrated Device Technology, Inc.
(Continued)

*Primary Examiner* — Alfonso Perez Borroto
(74) *Attorney, Agent, or Firm* — Haynes and Boone, LLP.

(57) ABSTRACT

A wireless power enabled apparatus may comprise a wireless power receiver that includes a receive coil configured to generate an AC power signal responsive to a wireless power signal, a rectifier including a plurality of switches configured to receive the AC power signal and generate a DC rectified power signal, a regulator operably coupled with the rectifier to receive the DC rectified power signal and generate an output power signal, and control logic configured to generate a communication signal responsive to adjusting an input impedance of the regulator. A method of operating a wireless power receiver includes generating a rectified voltage responsive to receiving a wireless power signal, generating an output voltage from the rectified voltage with a voltage regulator, and controlling the voltage regulator during a communication mode of wireless power receiver to modulate a characteristic of the voltage regulator with data for transmission to a wireless power transmitter.

14 Claims, 5 Drawing Sheets

(51) Int. Cl.
*H02J 7/02* (2016.01)
*H02J 50/12* (2016.01)
*H02J 5/00* (2016.01)
*H02J 17/00* (2006.01)
*H02M 7/219* (2006.01)
*G05B 13/02* (2006.01)
*H02J 50/60* (2016.01)

(52) U.S. Cl.
CPC .............. *H02J 7/025* (2013.01); *H02J 17/00* (2013.01); *H02J 50/12* (2016.02); *H02M 7/219* (2013.01); *H04B 5/0031* (2013.01); *H02J 50/60* (2016.02); *Y02B 70/1441* (2013.01)

(58) Field of Classification Search
USPC ........................................................ 307/104
See application file for complete search history.

(56) References Cited

U.S. PATENT DOCUMENTS

| | | | |
|---|---|---|---|
| 2010/0277003 A1 | 11/2010 | Von Novak et al. | |
| 2010/0291869 A1* | 11/2010 | Wilson ...................... | G05F 1/46 455/41.1 |
| 2010/0320974 A1* | 12/2010 | Manlove ............... | H02M 3/157 323/222 |
| 2011/0163713 A1 | 7/2011 | Wang et al. | |
| 2011/0210620 A1 | 9/2011 | Shinoda et al. | |
| 2011/0291489 A1 | 12/2011 | Tsai et al. | |
| 2012/0146425 A1 | 6/2012 | Lee et al. | |
| 2013/0140906 A1* | 6/2013 | Tanabe ................... | H02J 17/00 307/104 |
| 2013/0147279 A1* | 6/2013 | Muratov ................. | H02J 5/005 307/104 |
| 2013/0257360 A1 | 10/2013 | Singh | |
| 2013/0260676 A1 | 10/2013 | Singh | |
| 2013/0307471 A1* | 11/2013 | Ichikawa ................ | H02J 7/007 320/108 |
| 2014/0265610 A1 | 9/2014 | Bakker et al. | |
| 2014/0285027 A1* | 9/2014 | Sakamoto ............. | B60L 11/182 307/104 |
| 2015/0340881 A1* | 11/2015 | Nakano ................... | H02J 5/005 307/104 |

OTHER PUBLICATIONS

Integrated Device Technology, "IDT Wireless Power Receiver", Product Brief, IDTP9020, 2 pages, Aug. 30, 2012.
Texas Instruments, "bq5105x Direct Charging Efficiency Comparison", Application Report, pp. 1-5, © 2012 Texas Instruments Incorporated, Oct. 2012.
Texas Instruments, "bq51050BEVM-764, Integrated Wireless Power Li-Ion Charger Receiver", User's Guide, pp. 1-25, © 2012 Texas Instruments Incorporated, Oct. 2012.
Texas Instruments, "High-Efficiency Qi v1.1-Compliant Wireless Power Receiver and Battery Charger", Product Brief, 4 pages, © 2012 Texas Instruments Incorporated, Jul. 2012.
International Search Report for PCT Application No. PCT/US2015/013970 issued by the Korean Intellectual Property Office dated Apr. 27, 2015, pp. 1-3.
Written Opinion for PCT Application No. PCT/US2015/013970 issued by the Korean Intellectual Property Office dated Apr. 27, 2015, pp. 1-7.

* cited by examiner

APPARATUSES AND RELATED METHODS FOR COMMUNICATION WITH A WIRELESS POWER RECEIVER

CROSS-REFERENCE TO RELATED APPLICATION

This application is related to U.S. patent application Ser. No. 13/801,953, filed Mar. 13, 2013, and entitled "Apparatuses and Related Methods for Modulating Power of a Wireless Power Receiver."

FIELD

Embodiments of the present disclosure relate generally to wireless power transfer and, more particularly, to apparatuses and related method for communication between a wireless power receiver and a wireless power transmitter.

BACKGROUND

Battery-powered devices (e.g., consumer electronic devices, electric and hybrid automobiles, etc.) are charged from a power source (e.g., AC power outlet) through a charging device. The charging device couples the battery to the power source through an adaptor. The cord extending between the power source and the battery-powered device can take up space. In situations where multiple devices require charging, each with their own charger and cord, the charging area can become cramped and inconvenient.

Approaches are being developed that use over-the-air or wireless power transmission between a transmitter and a receiver coupled to the electronic device. Wireless power transmission using inductive coils is one method considered as an un-tethered method for transferring power wirelessly through a coupled wireless power signal. In wireless power transmission, power is transferred by transmitting a wireless power signal through a transmit coil. On the receiver side, a receive coil may couple with the transmit coil through the wireless power signal, thus, receiving the transmitted power wirelessly. The distance between the transmitter coil and receive coil, at which efficient power transfer can take place, is a function of the transmitted energy and the required efficiency. The coupling coefficient (k) is a function of the distance between the coils, the coil sizes, and materials. The power conversion efficiency (e.g., coupling factor, coupling quality) may be significantly improved if the coils are sized and operated at such a frequency that they are physically within the so-called "near-field zone" of each other.

Communication in conventional wireless power charging arrangements typically cause an impedance change (e.g., capacitive or resistive) on the receive coil that is used to send information from the wireless power receiver to the wireless power transmitter. For example, capacitors may be coupled with a plurality of switches to function as a capacitive modulation circuit that may modulate (e.g., add and subtract) capacitance to the LC network (resonant tank). Conventional wireless power receivers may control the switches to modulate the amount of power coupled to the LC network, which is detected by the wireless power transmitter. As a result, communication from the wireless power receiver to the wireless power transmitter may be enabled through modulation of the parallel capacitance of the receive coil within the LC network of the wireless power receiver. This impedance change may result in an increased system losses and lower system efficiency. Large load changes on the output of the wireless power receiver may also cause false communication signals, which may be typically resolved by increasing the amount of output capacitance and passively changing the receiver control loop compensation to have low sensitivity to these events.

BRIEF SUMMARY

Embodiments of the present disclosure include a wireless power enabled apparatus, comprising a wireless power receiver. The wireless power receiver includes a receive coil configured to generate an AC power signal responsive to a wireless power signal; a rectifier including a plurality of switches configured to receive the AC power signal and generate a DC rectified power signal; a regulator operably coupled with the rectifier to receive the DC rectified power signal and generate an output power signal; and control logic configured to generate a communication signal responsive to adjusting an input impedance of the regulator.

Another embodiment of the present disclosure includes a wireless power enabled apparatus comprising a wireless power receiver. The wireless power receiver includes a receive coil; a rectifier configured to receive a power signal generated from the receive coil and generate a rectified voltage in response thereto; a regulator configured to receive the rectified voltage and generate an output voltage in response thereto; and control logic configured to adjust a characteristic of the regulator during a communication mode of the wireless power receiver for modulation of the communication signal to be detected by a wireless power transmitter.

Another embodiment of the present disclosure includes a method of operating a receiver side of a wireless power transfer system. The method comprises generating a rectified voltage responsive to receiving a wireless power signal, generating an output voltage from the rectified voltage with a voltage regulator, and controlling the voltage regulator during a communication mode of wireless power receiver to modulate a characteristic of the voltage regulator with data for transmission to a wireless power transmitter.

DETAILED DESCRIPTION

Figure 1:
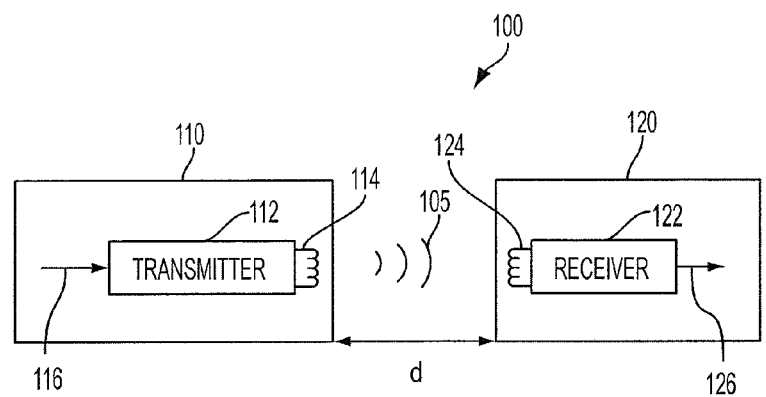
FIG. 1 is a schematic block diagram of a wireless power transfer system.

In the following description, reference is made to the accompanying drawings in which is shown, by way of illustration, specific embodiments of the present disclosure. Other embodiments may be utilized and changes may be made without departing from the scope of the disclosure. The following detailed description is not to be taken in a limiting sense, and the scope of the present invention is defined only by the appended claims.

Furthermore, specific implementations shown and described are only examples and should not be construed as the only way to implement or partition the present disclosure into functional elements unless specified otherwise herein. It will be readily apparent to one of ordinary skill in the art that the various embodiments of the present disclosure may be practiced by numerous other partitioning solutions.

In the following description, elements, circuits, and functions may be shown in block diagram form in order not to obscure the present disclosure in unnecessary detail. Additionally, block definitions and partitioning of logic between various blocks is exemplary of a specific implementation. It will be readily apparent to one of ordinary skill in the art that the present disclosure may be practiced by numerous other partitioning solutions. Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the embodiments disclosed herein may be implemented or performed with a general-purpose processor, a special-purpose processor, a Digital Signal Processor (DSP), an Application-Specific Integrated Circuit (ASIC), a Field-Programmable Gate Array (FPGA) or other programmable logic device, a controller, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A general-purpose processor may be considered a special-purpose processor while the general-purpose processor executes instructions (e.g., software code) stored on a computer-readable medium. A processor may also be implemented as a combination of computing devices, such as a combination of a DSP and a microprocessor, a plurality of microprocessors, one or more microprocessors in conjunction with a DSP core, or any other such configuration.

Also, it is noted that the embodiments may be described in terms of a process that may be depicted as a flowchart, a flow diagram, a structure diagram, or a block diagram. Although a process may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, etc. Furthermore, the methods disclosed herein may be implemented in hardware, software, or both. If implemented in software, the functions may be stored or transmitted as one or more instructions or code on computer readable media. Computer-readable media includes both computer storage media and communication media, including any medium that facilitates transfer of a computer program from one place to another.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed or that the first element must precede the second element in some manner. In addition, unless stated otherwise, a set of elements may comprise one or more elements.

It should be recognized that the devices of a wireless power transfer system is described herein primarily with respect to functionality of wireless power transfer and data communication; however, it should be recognized that the wireless power transfer system may include additional components to perform other features not specifically described herein or shown in the various figures. For example, wireless power enabled devices may include foreign object detection modules, I/O modules for interfacing with a user, memory for storing instructions and data, various sensors, processors, controllers, voltage regulators, among other components. The figures and accompanying description may, therefore, be somewhat simplified to focus on the various apparatuses and methods that are configured to modulate the power generated by the wireless power receiver.

FIG. 1 is a schematic block diagram of a wireless power transfer system 100. The wireless power transfer system 100 includes a wireless power transmitting apparatus 110, and a wireless power receiving apparatus 120. The wireless power transmitting apparatus 110 includes a wireless power transmitter 112 having a transmit coil 114 configured to generate a wireless power signal 105 (e.g., electric field, magnetic field, electromagnetic field, etc.) for providing power transfer to the wireless power receiving apparatus 120. The wireless power receiving apparatus 120 includes a wireless power receiver 122 having a receive coil 124 configured to couple with the wireless power signal 105. The transmit coil 114 and the receive coil 124 may be sized according to the particular devices and applications to be associated therewith.

An input signal 116 may be provided to the wireless power transmitter 112 for generating the wireless power signal 105 that provides a power transfer to the wireless power receiving apparatus 120. The wireless power receiver 122 may couple to the wireless power signal 105 and may generate an output signal 126 in response thereto. The output signal 126 may provide the power that is used by the wireless power receiving apparatus 120 for storing (e.g., charging a battery), consumption (e.g., providing system power), or a combination thereof.

The wireless power transmitter 112 and the wireless power receiver 122 are separated by a distance (d). In some embodiments, the wireless power transmitter 112 and the wireless power receiver 122 may be configured according to a mutual inductance relationship, such that when the resonant frequency of the wireless power receiver 122 and the resonant frequency of the wireless power transmitter 112 are substantially identical, transmission losses between the wireless power transmitter 112 and the wireless power receiver 122 are minimal. Likewise, the frequency of the wireless power signal 105 may be set by the wireless power transmitter 112 at or near the resonant frequencies of the coils 114, 124. As a result, an effective power transfer may occur by coupling a large portion of the energy in the near-field of the transmit coil 114 to the receive coil 124 rather than propagating most of the energy in an electromagnetic wave to the far-field. If the wireless power receiving apparatus 120 is in the near-field (within some distance (d)), inductive coupling may occur between the transmit coil 114 and the receive coil 124. The area around the transmit coil 114 and receive coil 124 where this near-field inductive coupling may occur may be referred to as a "coupling region." Because of this mutual inductance relationship, the wireless power transfer may be referred to as inductive wireless power transfer.

The transmit coil 114 and the receive coil 124 may be configured as a "loop" antenna, which may also be referred to herein as a "magnetic" antenna or an "inductive" antenna. Loop antennas may be configured to include an air core or a physical core such as a ferrite core. Air core loop antennas may be more tolerable to extraneous physical devices placed in the vicinity of the core. Furthermore, an air core loop antenna allows the placement of other components within the core area. In addition, an air core loop may more readily enable placement of the receive coil 124 within a plane of the transmit coil 114 where the coupling region of the transmit coil 114 may be more powerful.

The wireless power receiving apparatus 120 may be a mobile electronic device, such as a cell phone, a smart phone, a media player (e.g., mp3 player, DVD player, etc.), an electronic reader, a tablet computer, a personal digital assistant (PDA), a camera, a laptop computer, and personal electronic device in which wireless power signal 105 may be received. The wireless power receiving apparatus 120 may also be a less mobile electronic device, such as a television, personal computer, media player (e.g., DVD player, Blu-ray player, etc.) or any other device that may operate by, and/or store electrical power. The wireless power receiving apparatus 120 may be one of a number of other items, such as an automobile or any other devices that may include batteries that may be charged through the wireless power transmitting apparatus 110.

The wireless power transmitting apparatus 110 may be a device that may, at times, also be the recipient of wireless power transfer. In other words, some devices may be configured as both a wireless power transmitting apparatus 110 and a wireless power receiving apparatus 120, such that the device may transmit wireless power or receive wireless power depending on the mode of operation. Thus, embodiments of the present disclosure include devices that may include a wireless charging transceiver configured to operate in either a transmit mode or a receive mode. Using the term "receiver" indicates that a device is configured to receive wireless power transfer, but should not be interpreted to mean that the device only operates as a receiver. Similarly, using the term "transmitter" indicates that the device is configured to transmit wireless power, but should not be interpreted to mean that the device only operates as a transmitter.

Figure 2:
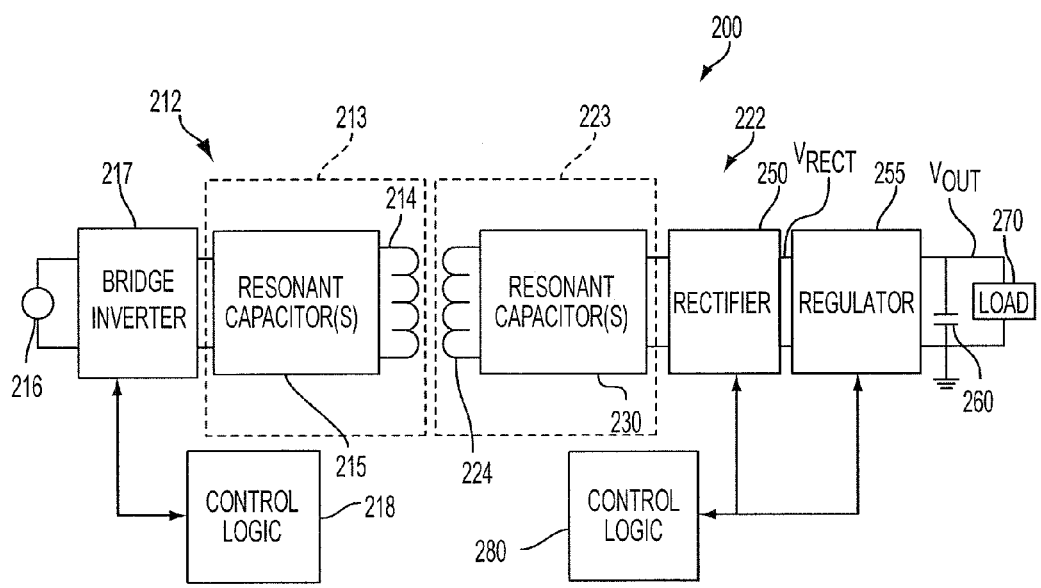
FIG. 2 is a schematic block diagram of a wireless power transfer system.

FIG. 2 is a schematic block diagram of a wireless power transfer system 200 according to an embodiment of the present disclosure. The wireless power transfer system 200 includes a wireless power transmitter 212 and a wireless power receiver 222. The wireless power transmitter 212 and the wireless power receiver 222 may be configured to couple with each other according to a mutual inductance relationship such that wireless power signal 105 (FIG. 1) may be transferred from the wireless power transmitter 212 to the wireless power receiver 222.

The wireless power transmitter 212 may include a resonant tank 213, a bridge inverter 217, and control logic 218 coupled together to generate the wireless power signal 105 transmitted to the wireless power receiver 222. The resonant tank 213 may include a transmit coil 214 coupled with resonant capacitors 215. The bridge inverter 217 of the wireless power transmitter 212 may include a full bridge inverter, a half bridge inverter, or other appropriate circuit for receiving a DC input signal 216 and generate an AC signal through the transmit coil 214 for generating the wireless power signal 105.

The wireless power receiver 222 includes a resonant tank 223, rectifier 250, and a regulator 255, and control logic 280 coupled together to receive the wireless power signal 105 and generate an output signal ($V_{OUT}$) in response thereto. The output signal ($V_{OUT}$) may be provided to a load 270 (e.g., a battery, system components, etc.), which may also have an output capacitor 260. The resonant tank 223 may include a receive coil 224 coupled with resonant capacitors 230. The wireless power transmitter 212 and the wireless power receiver 222 may be incorporated within a wireless power transmitting apparatus 110 (FIG. 1) and a wireless power receiving apparatus 120 (FIG. 1), respectively. The transmit coil 214 and the receive coil 224 (and other components) may be sized according to the particular devices and applications to be associated therewith.

The wireless power transmitter 212 and wireless power receiver 222 may be generally configured as discussed above with respect to FIG. 1. The configurations of the LC networks within the resonant tanks 213, 223 may generally determine the resonant frequencies of the wireless power transmitter 212 and the wireless power receiver 222, respectively. For example, the resonant frequency of the resonant tanks 213, 223 may be based on the inductance of their respective inductive coil and the capacitance of the plates of the capacitors.

During wireless power transmission, the input signal 216 (a DC signal) may be received by the bridge inverter 217. The bridge inverter 217 may generate an AC current that flows through the resonant tank 213 to generate a time-varying signal for transmitting the wireless power signal 105. Thus, the wireless power signal 105 may be a time-varying signal that is substantially sinusoidal, having a frequency that may be based on the switching frequency of the bridge inverter 217 of the wireless power transmitter 212. In some embodiments, the frequency of the wireless power signal 105 may be set according to the desired frequency, such as a frequency for a particular wireless power standard. The resonant tank 213 may be configured such that the resonant frequency is approximately the frequency of the wireless power signal 105. In some embodiments, it may be desirable for the frequency of the wireless power signal 105 to differ somewhat from the resonant frequency of the resonant tank 213, such as to reduce the peak-to-peak current through the transmit coil 214.

In order to receive wireless power signal 105, the wireless power receiver 222 may be placed in the coupling region of the wireless power transmitter 212 such that inductive coupling may be achieved. As a result, the wireless power receiver 222 may receive the wireless power signal 105 and generate an AC power responsive thereto. In order for the power to be used by the load 270, the AC power may be converted to a DC power. The rectifier 250 may generate a rectified voltage ($V_{RECT}$) as well as a rectified current ($I_{RECT}$) flowing through the resonant tank 223. In some embodiments, the rectifier 250 may be configured as a synchronous rectifier. As a result, the rectifier 250 may include one or more switches that are controlled in such a manner to generate the DC output power signal (i.e., rectified voltage ($V_{RECT}$) and rectified current ($I_{RECT}$)). In some embodiments, the rectifier 250 may include one or more diodes configured to generate the DC output power signal.

The regulator 255 may receive the rectified voltage ($V_{RECT}$) and convert the rectified voltage to have a desired voltage level for the output voltage ($V_{OUT}$). For example, in some embodiments, the regulator 255 may convert the rectified voltage ($V_{RECT}$) from a low voltage to a relatively higher voltage for the output voltage ($V_{OUT}$). In some embodiments, the regulator 255 may convert the rectified voltage ($V_{RECT}$) from a high voltage to a relatively lower voltage for the output voltage ($V_{OUT}$). In some embodiments, the regulator 255 may invert the rectified voltage ($V_{RECT}$) from a positive voltage to a negative voltage, or vice versa. The regulator 255 may be configured according to one of a variety of different voltage regulator topologies. For example, the regulator 255 may be configured according to one or more of a buck topology, a boost topology, a buck-boost topology, an inverting topology, and a low dropout (LDO) topology. In some embodiments, the regulator 255 may be configured according to a transformer-based topology (e.g., forward, flyback, etc.). The operation of the regulator 255 may be controlled by the control logic 280 according to the topology being used.

The control logic 280 of the wireless power receiver 222 may be configured to control one or more operations of the wireless power receiver 222. Each of the control logic 218, 280 may be implemented within a processor (e.g., microcontroller) or other circuitry that is configured (e.g., programmed) to perform various operations of embodiments of the present disclosure. Each of the control logic 218, 280 may further include computer-readable media (e.g., memory) storing computing instructions for execution by the processor related to performing processes of the embodiments of the present disclosure. Memory may include volatile and non-volatile memory. In addition, each of the control logic 218, 280 may further control other functions of the respective wireless power transmitter 212, wireless power receiver 222, such as controls related to foreign object detection, device operation, etc. The control logic 218, 280 may each include different sub-blocks that perform one or more of the above functions separately rather than by employing within a single process, routine, program, etc. In addition, the control logic 218, 280 may each employ different hardware elements for different functions.

In some embodiments, the regulator 255 may be configured to operate as a constant current source during a charging mode of an energy storage device (e.g., battery). During a communication mode, the charging current and/or the input impedance of the regulator 255 may be dynamically adjusted for communicating data to the wireless power transmitter 212. In some embodiments, the regulator 255 may include a plurality of parallel regulators, wherein at least one secondary regulator is configured to store energy onto a dedicated capacitor using the primary regulator's impedance as a control input.

In addition to wireless power transfer, the wireless power transmitter 212 and the wireless power receiver 222 may communicate information therebetween. For example, data may be exchanged during initialization of the wireless power transfer, during wireless power transfer, and/or upon conclusion of wireless power transfer. In some embodiments, the wireless power receiver 222 may be configured to communicate data across the receive coil 224 to the wireless power transmitter 112 by varying the impedance of the regulator 255. Varying the impedance of the regulator 255 may include adaptive voltage positioning, by using a secondary energy storage device, by using a variable duty cycle regulator, and combinations thereof. In other words, the regulator 255 may be configured to dynamically change its reactive impedance to communicate data back to the wireless power transmitter 212. By dynamically changing the impedance of the regulator 255, the modulation implemented for communication protocols occurs further "downstream" in the receiver circuit, which may improve the signal to noise ratio (SNR), improve efficiency, and reduce power consumption over conventional methods.

In some embodiments, the impedance of the regulator 255 may be adjusted at different times in the sequence of the input waveform (e.g., sine wave) for adaptive voltage positioning. For example, at the beginning of the switching cycle of the waveform generated by the receive coil 224, it may be desired to increase the amount of power pulled by the regulator 255. During the middle of the cycle, even more power than is needed may be pulled and stored in the output capacitor 260. At the next switching cycle of the input waveform, the power pulled by the regulator 255 may be reduced (i.e., the impedance of the regulator increased) and the power that was stored may be pushed back onto the receive coil 224, which may cause a voltage increase interpreted as data to the wireless power transmitter 212.

In some embodiments, the wireless power receiver 222 may be configured to modulate the communication signal by adjusting the impedance of a voltage regulator with respect to the impedance of the receive coil. Whereas conventional voltage regulators simply generate a constant current provided to the load 270, embodiments of the present disclosure may dynamically change the current limit for the control loop of the regulator 255 and accordingly modulate the impedance of the regulator 255 for communicating with the wireless power transmitter 212. Dynamically changing the current limit may be dependent on the voltage generated by the receive coil 224. As an example, during wireless power generation, the wireless power receiver 222 may be configured to provide a constant current to the load 270. If, however, communication is desired, the wireless power receiver 222 may adjust the output current it generates to provide a constant average power to the load 270 rather than a constant output current. To add the communications element to the regulator 255, the control logic 280 may determine whether a 1 or a 0 should be sent to the transmitter. The control logic 280 may then control the regulator 255 to accordingly increase or decrease the current limit in the control loop and output current provided to the load 270.

From the perspective of the wireless power transmitter 212, the wireless power transmitter 212 may monitor its output signal for fluctuations to be interpreted as data being received from the wireless power receiver 222. In other words, the modification of the regulator 255 impedance can be detected by the wireless power transmitter 212 and interpreted as communication information. The wireless power transmitter 212 may be configured to operate according to a wireless power standard (e.g., WPC, PMA, etc.) or as a custom transmitter for a particular receiver type. In some embodiments, the firmware in the wireless power transmitter 212 and wireless power receiver 222 may be updated to allow for TX/RX communication protocols to be supported by already deployed solutions. One benefit that may result from one or more embodiments described herein is that the SNR may be improved. As a result, bit rates may be increased (e.g., more bits may be transmitted in the channel) without losing data. Thus, a custom transmitter and receiver may be implemented to have more bits across it than conventional devices are capable of.

Figure 3:
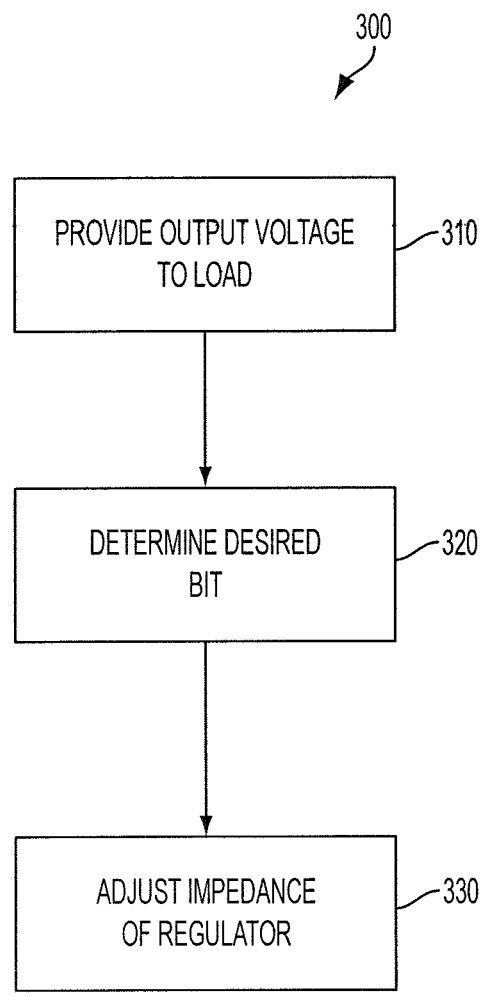
FIG. 3 is a flowchart illustrating a method of communicating data in a wireless power system.

FIG. 3 is a flowchart 300 illustrating a method of communicating data in a wireless power system. At operation 310, an output voltage may be provided to a load. The output voltage may be provided during wireless power charging between the wireless power transmitter and the wireless power receiver. When just wireless power transfer is occurring without communication, the output voltage may have a steady state operating point for the load.

At operation 320, it may be determined what type of bit (e.g., 1 or 0) to send as communication data from the wireless power receiver to the wireless power transmitter. In other words, the wireless power receiver may desire to communicate with the wireless power transmitter and send a message comprising one or more bits of data.

At operation 330, the impedance of the regulator may be adjusted (e.g., up or down) depending on the desired bit. Adjusting the impedance may include adaptive voltage positioning. Adaptive voltage positioning of the output voltage ($V_{OUT}$) regulation may be performed via buck, boosting, inverting, and linear topologies, and combinations thereof. In some embodiments, the control logic may adjust its input impedance with respect to the receive coil in order to provide the necessary signal for communication to the wireless power transmitter. Adjusting the input impedance may include delivering an excess of power to the load causing the output voltage ($V_{OUT}$) to increase. Similarly, the control logic may adjust its input impedance to reduce the power delivered to the load causing the output voltage ($V_{OUT}$) to decrease. In other words, the control logic may adaptively position the output voltage ($V_{OUT}$) high and low to represent the bits of the message being sent to the wireless power transmitter 212. In some embodiments, the regulator may include a control loop that has a current reference target that is modulated up or down based on whether a one or zero is to be transmitted to the wireless power transmitter. For this methodology to be effective, the output capacitor may have a sufficient capacitance to absorb normal load transients as well as rail variations induced by the communication modulation requirements.

FIGS. 4A-4G are simplified schematic block diagrams of a wireless power receiver 222A-222G according to an embodiment of the present disclosure. The wireless power receivers 222A-222G may be configured to generate an output voltage responsive to the presence of the wireless power signal, as well as communicate data between the wireless power receiver and the wireless power transmitter.

Figure 4A:
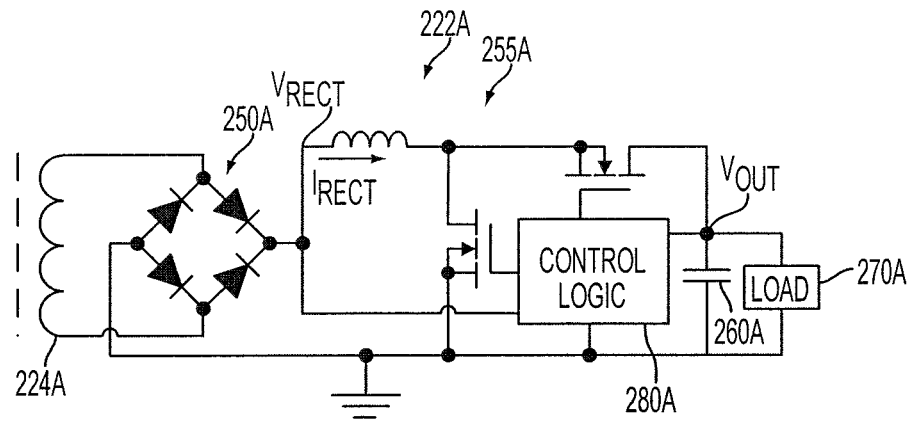
FIGS. 4A-4G are simplified schematic block diagrams of a wireless power receiver according to an embodiment of the present disclosure.

Referring to FIG. 4A, the wireless power receiver 222A includes the receive coil 224A, the rectifier 250A, the regulator 255A, the control logic 280A, and the output capacitor 260A that are configured generally as discussed above to generate an output voltage ($V_{OUT}$) responsive to a wireless power signal 105 (FIG. 1). The output voltage ($V_{OUT}$) may be provided to the load 270A. As shown in FIG. 4A, the rectifier 250A may be an asynchronous rectifier (e.g., employing diodes) that is in a full bridge configuration.

In addition, the regulator 255A may be configured in a synchronous boost configuration with the control logic 280A controlling the switches of the regulator 255A to convert the rectified voltage ($V_{RECT}$) (a relatively lower voltage) to the output voltage ($V_{OUT}$) (a relatively higher voltage). Because the output voltage ($V_{OUT}$) is greater than the rectified voltage (VREF) generated by the receive coil 224A and the rectifier 250A, the receive coil 224A may be relatively smaller than other regulator topologies.

The control logic 280A may be configured to control the regulator 255A so that the effective impedance of the regulator 255A can be controlled to mimic almost any impedance. The control logic 280 control the switches of the regulator 255A to alternate between coupling the inductor to ground allowing current to build up and then coupling the inductor to the load 270 so that the current flows through the positive rail of the load 270. In order to adjust the impedance of the regulator 255A, the control logic 280A may dynamically adjust its current reference target in its control loop.

Figure 4B:
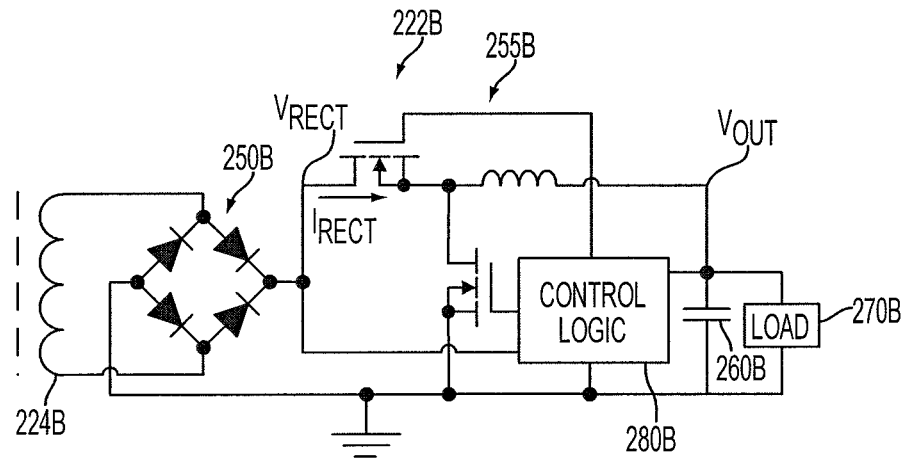

Referring to FIG. 4B, the wireless power receiver 222B includes the receive coil 224B, the rectifier 250B, the regulator 255B, the control logic 280B, and the output capacitor 260B that are configured generally as discussed above to generate an output voltage ($V_{OUT}$) responsive to a wireless power signal 105 (FIG. 1). The output voltage ($V_{OUT}$) may be provided to the load 270B. As shown in FIG. 4B, the rectifier 250B may be an asynchronous rectifier (e.g., employing diodes) that is in a full bridge configuration.

In addition, the regulator 255B in a synchronous buck configuration with the control logic 280B controlling the switches of the regulator 255B to convert the rectified voltage ($V_{RECT}$) (a relatively higher voltage) to the output voltage ($V_{OUT}$) (a relatively lower voltage). The control logic 280B may be configured to control the regulator 255B so that the effective impedance of the regulator 255B can be controlled so that the regulator 255B reactively transfers power from the output capacitor 260B back to the receive coil 224B for purposes of communication modulation. In some embodiments, the output capacitor 260B may transfer power to the receive coil 224B in a real manner for purposes of communication modulation. For example, the input voltage may sag below the output voltage ($V_{OUT}$) with back to back devices in an LDO and IC, a controlled real reverse current flow may be generated for purposes of communication modulation.

Figure 4C:
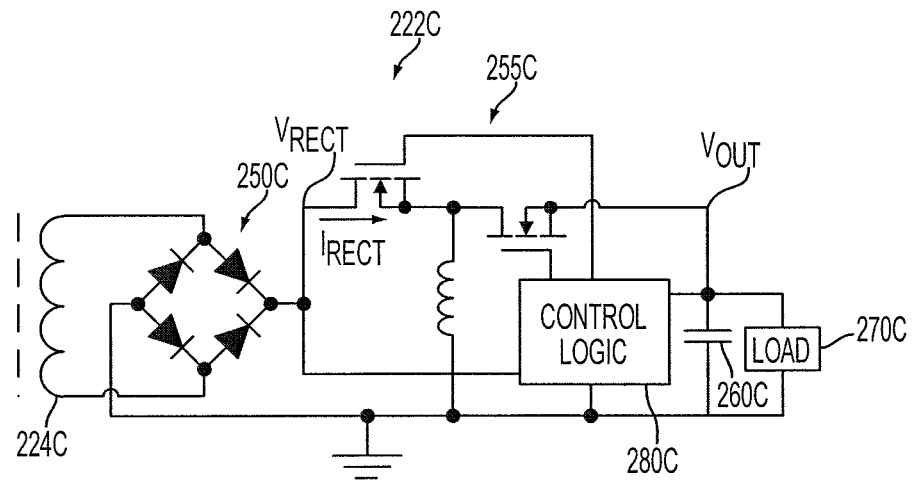

Referring to FIG. 4C, the wireless power receiver 222C includes the receive coil 224C, the rectifier 250C, the regulator 255C, the control logic 280C, and the output capacitor 260C that are configured generally as discussed above to generate an output voltage ($V_{OUT}$) responsive to a wireless power signal 105 (FIG. 1). The output voltage ($V_{OUT}$) may be provided to the load 270C. As shown in FIG. 4C, the rectifier 250C may be an asynchronous rectifier (e.g., employing diodes) that is in a full bridge configuration.

In addition, the regulator 255C is in a synchronous inverting configuration with the control logic 280C controlling the switches of the regulator 255C to convert the rectified voltage ($V_{RECT}$) to the output voltage ($V_{OUT}$) (an inverted version of $V_{RECT}$). The control logic 280C may be configured to control the regulator 255C to adjust the switching cycle of the switches of the regulator 255C in order to change the current flowing through the inductor. The switching cycle may include the control logic 280C may cause the rectified current ($I_{RECT}$) to build up by driving the inductor of the regulator 255C from the receive coil 224C or to change the direction of current by operating the second switch of the regulator 255C to drive the inductor from the output capacitor 260 and/or the load 270. As a result, the impedance of the regulator 255C may be modulated for communication purposes to send data to the wireless power transmitter. The inverting topology may generate any output voltage ($V_{OUT}$) from any rectified voltage ($V_{RECT}$), which may provide some flexibility and freedom in the design.

Figure 4D:
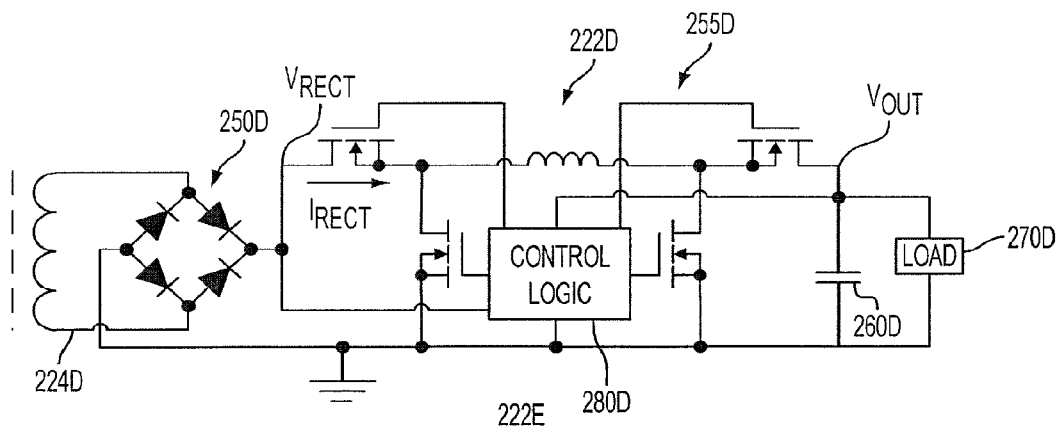

Referring to FIG. 4D, the wireless power receiver 222D includes the receive coil 224D, the rectifier 250D, the regulator 255D, the control logic 280D, and the output capacitor 260D that are configured generally as discussed above to generate an output voltage ($V_{OUT}$) responsive to a wireless power signal 105 (FIG. 1). The output voltage ($V_{OUT}$) may be provided to the load 270D. As shown in FIG. 4D, the rectifier 250D may be an asynchronous rectifier (e.g., employing diodes) that is in a full bridge configuration.

In addition, the regulator 255D is in a synchronous buck-boost configuration with the control logic 280D controlling the switches of the regulator 255D to convert the rectified voltage ($V_{RECT}$) down (i.e., buck) to a lower intermediate voltage and then increase (i.e., boost) the intermediate voltage to generate the output voltage ($V_{OUT}$). The buck and boost portions of the regulator 255D may share an inductor to perform the conversion. The control logic 280D may be configured to control the regulator 255D so that the effective impedance of the regulator 255D can be controlled so that the regulator 255D reactively transfers power from the output capacitor 260D back to the receive coil 224D for purposes of communication modulation. The buck-boost configuration is shown in FIG. 4D shares the inductor between the buck portion and the boost portion. In some embodiments, there may be two inductors—one for the boost portion and another for the buck portion.

Figure 4E:
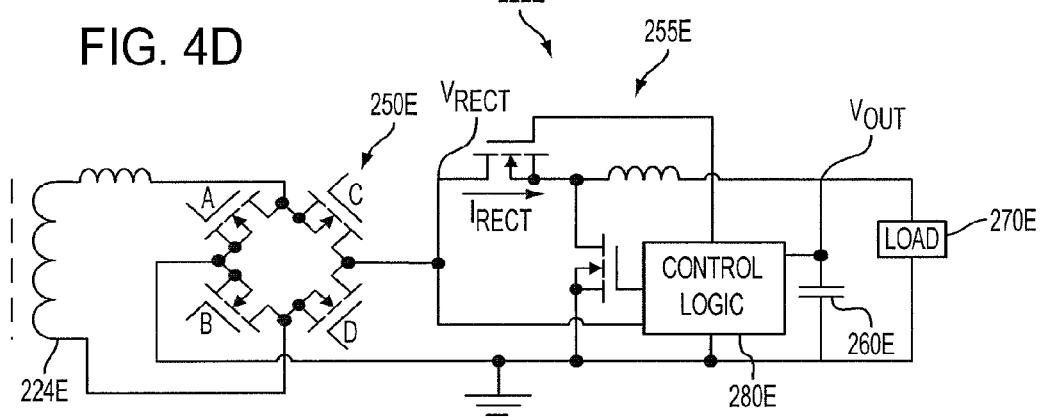

Referring to FIG. 4E, the wireless power receiver 222E includes the receive coil 224E, the rectifier 250E, the regulator 255E, the control logic 280E, and the output capacitor 260C that are configured generally as discussed above to generate an output voltage ($V_{OUT}$) responsive to a wireless power signal 105 (FIG. 1). The output voltage ($V_{OUT}$) may be provided to the load 270E. As shown in FIG. 4E, the rectifier 250E may be an active synchronous rectifier (e.g., employing switches) that is in a full bridge configuration. The rectifier 250E and the inductor may combine to form a boost circuit. For example, the control logic 280E may control the rectifier 250E by enabling switches A/B or switches C/D boost to generate the rectified voltage ($V_{RECT}$). In addition, the regulator 255E is in a synchronous buck configuration with the control logic 280E controlling the switches of the regulator 255E to convert the rectified voltage ($V_{RECT}$) to the output voltage ($V_{OUT}$) (an inverted version of $V_{RECT}$).

Figure 4F:
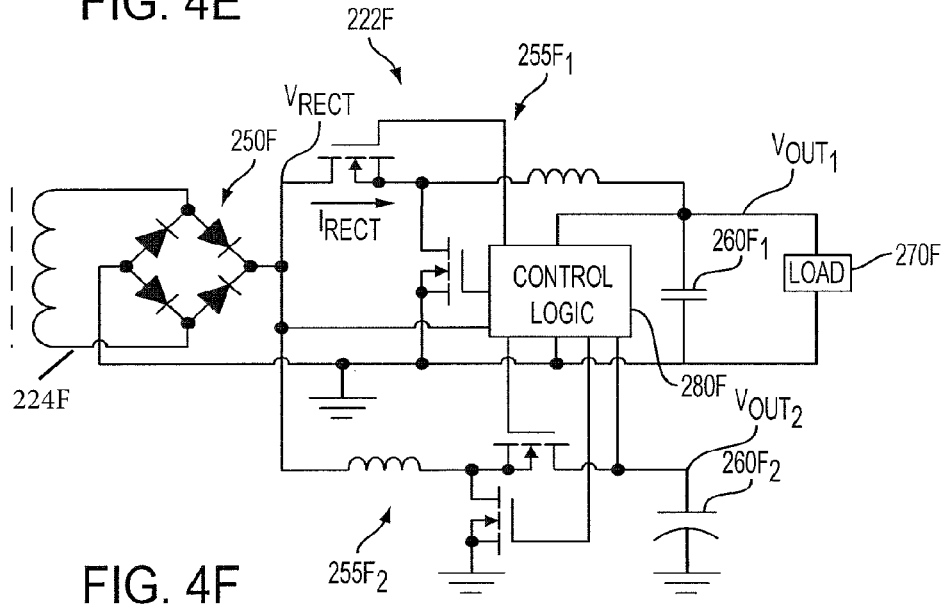

Referring to FIG. 4F, the wireless power receiver 222F includes the receive coil 224F, the rectifier 250F, the regulator 255F, the control logic 280F, and the output capacitor 260F that are configured generally as discussed above to generate an output voltage ($V_{OUT}$) responsive to a wireless power signal 105 (FIG. 1). The output voltage ($V_{OUT}$) may be provided to the load 270F. As shown in FIG. 4C, the rectifier 250F may be an asynchronous rectifier (e.g., employing diodes) that is in a full bridge configuration.

In addition, the regulator 255F may include a plurality of regulators $255F_1$, $255F_2$. A first regulator $255F_1$ and a second regulator $255F_2$ may be coupled to the rectifier 250F to each receive the rectified voltage ($V_{RECT}$). In the embodiment of FIG. 4F, the first regulator 255F is in a synchronous buck configuration that generates a first output voltage ($V_{OUT1}$), and the second regulator $255F_2$ is in a reversible buck-boost configuration that generates a second output voltage ($V_{OUT2}$). The first output voltage ($V_{OUT1}$) may be provided to the load 270F, and the second output voltage ($V_{OUT2}$) may be provided to a secondary energy storage device $260F_2$ that is coupled with the second regulator $255F_2$. The control logic 280F may control the switches of the regulators $255F_1$, $255F_2$ to convert the rectified voltage ($V_{RECT}$) to the output voltages ($V_{OUT1}$, $V_{OUT2}$). As a result, the load current and impedance modulation may occur with the assistance of either regulator $255F_1$, $255F_2$.

In some embodiments, the communication signal may be modulated at the coil side. In other words, the second regulator $255F_2$ may be coupled before the first regulator $255F_1$. For example, as shown in FIG. 4F the inductor of the second regulator $255F_2$ may couple with the first regulator at the $V_{RECT}$ node. In some embodiments, the communication signal may be modulated on the output side allowing for the first regulator $255F_1$ to be configured as a constant load on the receive coil 224F. For example, the inductor of the second regulator $255F_2$ may be coupled after the first regulator 255 at the $V_{OUT1}$ node.

Figure 4G:
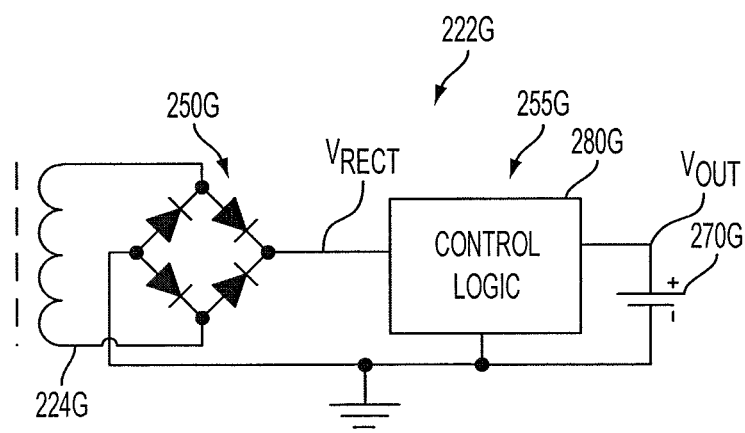

Referring to FIG. 4G, the wireless power receiver 222G includes the receive coil 224G, the rectifier 250G, the regulator 255G, and the control logic 280G that are configured generally as discussed above to generate an output voltage ($V_{OUT}$) responsive to a wireless power signal 105 (FIG. 1). The output voltage ($V_{OUT}$) may be provided to the load 270G. As shown in FIG. 4G, the rectifier 250G may be an asynchronous rectifier (e.g., employing diodes) that is in a full bridge configuration. The load 270G may include a battery or other energy storage/consumption device.

In addition, the regulator 255G may be a linear regulator device (e.g., LDO) incorporated within the control logic 280G. In such a configuration, the regulator 255G may be configured to extract power from the input waveform generated by the receive coil 224G and rectified by rectifier 250G. Power may be extracted only if the rectified voltage ($V_{RECT}$) is greater than the output voltage ($V_{OUT}$). The amount of power extracted for communication may vary depending on the situation. For example, if the load is relatively light, the control logic 280G may consume the extra power pulled from the receive coil 224G in order to prevent an overvoltage of the output rail. In some embodiments, it is contemplated that power may be transferred by the regulator 255G in a reverse manner because of parasitic diodes that may exist between the output voltage ($V_{OUT}$) and the rectified voltage ($V_{RECT}$).

While the present disclosure has been described herein with respect to certain illustrated embodiments, those of ordinary skill in the art will recognize and appreciate that the present invention is not so limited. Rather, many additions, deletions, and modifications to the illustrated and described embodiments may be made without departing from the scope of the disclosure. In addition, features from one embodiment may be combined with features of another embodiment while still being encompassed within the scope of the disclosure as contemplated by the inventor.

What is claimed is:

1. An apparatus for wireless power transfer, the apparatus comprising:
 a wireless power receiver, including:
 a receive coil configured to generate an AC power signal responsive to a wireless power signal;
 a rectifier coupled to the receive coil and configured to receive the AC power signal and generate a DC rectified power signal;
 a first regulator coupled with the rectifier to receive the DC rectified power signal and generate an output power signal;
 a second regulator coupled with the rectifier to receive the rectified power signal and generate an output voltage;
 a secondary storage device coupled with the second regulator to receive the output voltage of the second regulator; and
 control logic coupled to the second regulator and configured to communicate a wireless communication signal across the receive coil by adjusting an impedance of the second regulator;
 wherein an impedance of the first regulator is independent of said communicating the wireless communication signal;
 wherein the control logic is coupled to the first regulator to control the first regulator to generate the output power signal; and the control logic is configured to communicate the wireless communication signal across the receive coil by adjusting the impedance of the second regulator but not the first regulator.

2. The apparatus of claim 1, wherein the control logic is further configured to adjust the impedance by dynamically adjusting a current limit in a control loop for the second regulator.

3. The apparatus of claim 1, wherein the second regulator is selected from the group consisting of a buck converter, a boost converter, and a buck-boost converter.

4. The apparatus of claim 1, wherein the second regulator includes a transformer-based topology.

5. The apparatus of claim 1, further comprising an output capacitor operably coupled between the first regulator and a load.

6. The apparatus of claim 1, further comprising a load operably coupled with the wireless power receiver to receive the output power signal.

7. The apparatus of claim 6, wherein the load includes a battery.

8. A wireless power system comprising: a wireless power receiver, including:
a receive coil;
a rectifier coupled to the receive coil, configured to receive a power signal generated from the receive coil and generate a rectified voltage in response thereto;
a first regulator configured to receive the rectified voltage and generate an output power signal in response thereto;
a second regulator configured to receive the rectified voltage in parallel with the first regulator and generate an output voltage;
a secondary storage device configured to receive the output voltage of the second regulator; and
a first control logic coupled to the second regulator and configured to communicate a wireless communication signal across the receive coil by adjusting an impedance of the second regulator during a communication mode of the wireless power receiver;
wherein an impedance of the first regulator is independent of said communicating the wireless communication signal;
wherein the first control logic is coupled to the first regulator to control the first regulator to generate the output power signal; and
the first control logic is configured to communicate the wireless communication signal across the receive coil by adjusting the impedance of the second regulator but not the first regulator.

9. The wireless power system of claim 8, wherein the first regulator is configured to generate a constant average power to a load.

10. A method of operating a receiver side of a wireless power transfer system, the method comprising:
generating a rectified voltage responsive to receiving a wireless power signal from a receive coil;
generating an output power signal from the rectified voltage with a first voltage regulator;
generating an output voltage from the rectified voltage with a second voltage regulator;
receiving the output voltage from the second voltage regulator by a secondary storage device; and
controlling the second voltage regulator during a communication mode of the receiver side to communicate a wireless communication signal across the receive coil by adjusting an impedance of the second voltage regulator;
wherein an impedance of the first voltage regulator is independent of said communicating the wireless communication signal; and
wherein the communication signal is communicated by adjusting the impedance of the second voltage regulator but not the first voltage regulator.

11. The method of claim 10, wherein controlling the voltage regulator includes dynamically adjusting a current limit value of a control loop for the second voltage regulator.

12. The method of claim 10, wherein generating the output power signal includes generating a steady state operating point for a load current provided to a load when communication is not occurring between the receiver side of the wireless power transfer system and a wireless power transmitter.

13. The wireless power system of claim 8, wherein the first control logic is further configured to adjust the impedance by modulation of a current reference target in a control loop for the second regulator.

14. The wireless power system of claim 8, further comprising:
a wireless power transmitter, including:
a transmit coil configured to generate a wireless power signal; and
a second control logic configured to monitor the wireless power signal for fluctuations and interpret the fluctuations as data received from the wireless power receiver.

* * * * *